(12) United States Patent
Kusano et al.

(10) Patent No.: US 7,198,247 B2
(45) Date of Patent: Apr. 3, 2007

(54) MANDREL FOR PRODUCING QUARTZ GLASS AND PRODUCTION METHOD FOR OPTICAL FIBER MOTHER MATERIAL, OPTICAL FIBER AND QUARTZ GLASS BODY USING THE SAME

(75) Inventors: Yoshihisa Kusano, Koriyama (JP); Atsuyuki Shimada, Koriyama (JP); Toshiharu Hiraoka, Mitoyo-gun (JP)

(73) Assignees: Shin-Etsu Quartz Products Co., Ltd., Tokyo (JP); Toyo Tanso Co., Ltd., Osaka-Fu (JP)

( * ) Notice: Subject to any disclaimer, the term of this patent is extended or adjusted under 35 U.S.C. 154(b) by 499 days.

(21) Appl. No.: 10/343,167

(22) PCT Filed: Apr. 11, 2001

(86) PCT No.: PCT/JP01/03124

§ 371 (c)(1),
(2), (4) Date: Jan. 27, 2003

(87) PCT Pub. No.: WO02/10081

PCT Pub. Date: Feb. 7, 2002

(65) Prior Publication Data

US 2004/0099014 A1    May 27, 2004

(30) Foreign Application Priority Data

Jul. 31, 2000   (JP) .............................. 2000-230133
Jul. 31, 2000   (JP) .............................. 2000-230134
Jul. 31, 2000   (JP) .............................. 2000-230135

(51) Int. Cl.
*B29C 33/76*    (2006.01)

(52) U.S. Cl. ..................... 249/184; 249/175; 425/468
(58) Field of Classification Search ............... 249/63, 249/64, 175, 184; 425/468
See application file for complete search history.

(56) References Cited

U.S. PATENT DOCUMENTS

| 4,233,052 A | | 11/1980 | Dominick et al. |
| 5,282,734 A | * | 2/1994 | Pastureau et al. ............ 425/393 |
| 5,350,139 A | * | 9/1994 | Leyderman ................. 249/177 |
| 5,665,132 A | | 9/1997 | Ruppert et al. |
| 5,738,702 A | * | 4/1998 | Ruppert et al. ............... 65/483 |

FOREIGN PATENT DOCUMENTS

| EP | 163752 | | 12/1985 |
| JP | 63-147840 | | 6/1988 |
| JP | 4-331811 | * | 4/1991 |
| JP | 9-202632 | | 8/1997 |
| JP | 11-278857 | | 10/1999 |

OTHER PUBLICATIONS

Colvin et al, American Machinists' Handbook and Dictionary of Shop Terms, 7th ed., 1940, pp. 7, 43,46,47, 51.*
English Abstract for JP 4-331811.*

* cited by examiner

*Primary Examiner*—Donald Heckenberg
(74) *Attorney, Agent, or Firm*—Jordan and Hamburg LLP

(57) ABSTRACT

A mandrel for producing a large quartz glass body, comprising at least two columnar or cylindrical, carbon fiber-reinforced carbon composite members and joined in series by screw thread parts, wherein preferably the contact surface of the screw thread parts of the mandrel is impregnated and/or coated with carbon, and more preferably a reinforcing member made of a C/C composite is provided on the outer periphery of the screw thread parts.

4 Claims, 11 Drawing Sheets

MANDREL FOR PRODUCING QUARTZ GLASS AND PRODUCTION METHOD FOR OPTICAL FIBER MOTHER MATERIAL, OPTICAL FIBER AND QUARTZ GLASS BODY USING THE SAME

TECHNICAL FIELD

The present invention relates to a mandrel used for producing a large synthetic quartz glass body, and a method of producing an optical fiber mother material (matrix), an optical fiber and a quartz glass body that use the mandrel. In particular, the invention relates to a mandrel for precisely and low-costly making a large optical fiber mother material, a quartz glass body for producing a heat treatment jig used in the field of producing semiconductors, and a method of producing an optical fiber mother material, an optical fiber and a quartz glass body that use the mandrel.

BACKGROUND ART

Recently, synthetic quartz glass bodies including a quartz glass tube, ingot etc. which are materials for an optical fiber mother material and a heat treatment jig (core tube, wafer boat, etc.) used for a semiconductor production have been required high precision and high purity. Processes for fabricating optical fiber mother materials that have been used include: the outside vapor deposition method (hereinafter called the OVD method) that comprises rotating a columnar or cylindrical heatresisting substratum with a smooth outer peripheral surface, blowing and depositing quartz glass fine particles on the surface thereof, forming a porous quartz glass mother material and subsequently heating and transparently vitrifying the porous quartz glass mother material on the heat-resisting substratum or on the mold base inserted after the heat-resisting substratum is extracted, the vapor-phase axial deposition method (hereinafter called the VAD method) that involves depositing quartz glass fine particles in the axial direction of a starting rod to form a porous quartz glass mother material, which in turn is heated and transparently vitrified; the MCVD method; and a combination method of the above-described method. For a starting rod, a heat-resisting substratum, or a mold base used in the fabricatiing methods, materials including graphitized carbon as well as ceramics such as quartz glass, alumina, zirconia, mullite, silicon carbide, silicon nitride and boron nitride are used and, recently, carbon fiber-reinforced carbon composites (hereinafter called C/C composites) have come to be used.

As a large-sized optical fiber mother material with the lower cost is reqired, the large-sized optical fiber mother material for producing optical fibers has been attempted, but this requires large-sized porous quartz glass mother materials. Preparation of a large-sized, highly precise porous quartz glass mother material requires a starting rod, heat-resisting substratum or mold base that is more elongated with higher preciseness. When distortion, bend or the like of the starting rod, heat-resisting substratum or mold base occurs, it may create deflection in the center to disturb the shape formation of the porous quartz glass mother material, and during its transparent vitrification it may also produce a bend or distorton in the optical fiber mother material due to nonuniform heating because of the heating with rotation, which is intended to provide uniform heat from the heater, in that the mother material is heated with rotation so as to uniformly receive heat from a heater during its transparent vitrification. Furthermore, the large-sized optical fiber mother material increases the treatment temperature and imposes a large weight on itself, requiring further high load resistance and heat resistance in the starting rod, heat-resisting substratum or the mold base. Each of materials constituting the starting rod, the heat-resisting substratum and the mold base has different advantages and drawbacks. Quartz glass exhibits considerable heat resistance and also shows excellent processability as compared with ceramics etc. On the other hand, the increase in cost is significant for carry out the high level processing technology to achieve the extremely high level of preciseness, for example, in the case of preparation of a quartz glass mandrel with 50 mm or more in outside diameter and 5,000 mm or more in length. In addition, in the case where a number of short quartz glass rods are combined together to obtain an elongated quartz glass mandrel, this involves the welding of quartz glass rods. It is difficult to perform this operation while preventing bends at the welded portions, and this results in a cost increase. Even if an elongated quartz glass rod with high precision is obtained by means of the processing, care must be taken in the handling of the rods to prevent damage such as a fracture or cracks due to the nature of glass. Thus, in comparison with conventional small members, there are great increases in working difficulty and risk of breakage in the handling operation.

In the case where the above-described starting rod, heat-resisting substratum or mold base is made of ceramic, there are synergistically increased cost for production of the ceramic member, because such ceramics with highly purity and excellent heat resistance is very expensive, and has a difficulty in its processing so that the fabrication of such ceramics with high precision involves the grinding of a significant volume of the ceramics. In the case where the above-described starting rod, heat-resisting substratum or mold base is made of graphite, it is obtained with relatively low cost, and has an excellent heat resistance and processability and easiness in its handling. However, it lacks strength and it is thus difficult to achieve strength to withstand the load during the production or dehydration/transparent vitrification of a large porous quartz glass mother material. C/C composites that are recently proposed have problems for production such as synthesis or molding and problems for process precision. Because of these problem, the starting rod, heat-resisting substratum or mold base with lengths more than 1,000 mm and outside diameters more than 100 mm are very difficult to practically produce as a single member, and is therefore produced as an integrated member formed by joining a plurality of rod in series. The method used for the joining comprises perforating a hole 36 near the end of a rod and fixing by a pin 37, and joining the rod by pinching using a slit 38, as shown in FIG. 11. This joining method involves an excessive load on the pin and break it, resulting in incomplete connection and a loss of size precision. Accordingly, a desirable shape of an optical fiber mother material cannot be produced.

In addition, the production of a heat treatment jig used in semiconductor production also requires cost reduction. A conventional method so-called Bernoulli method, which melts and deposits a quartz powder while supplying it into an oxyhydrogen flame, cannot meet the requirement for large-sizing and high precision. Instead, there is proposed a method (hereinafter called the "mold melt method") that involves disposing a mandrel in the center of a heat-resisting mold made of carbon etc., filling a silicon dioxide powder between the mandrel and the mold and subsequently melting and transparently vitrifying the powder in a heating furnace. This mold melt method allows the reduction of the work load and the number of jigs and tools for grinding and cutting as compared with a conventional method that includes machining quartz glass block to a desirable shape. In addition, the method provides easy molding and very high material yields, lead to effective cost reduction. Mandrels disposed in the center of a heat-resisting mold in the mold melt method includes ceramics such as quartz glass, alumina, zirconia, silicon carbide and silicon nitride, graphitized carbon (hereinafter simply called "graphite"), and further carbon fiber-reinforced carbon composites. In order to obtain a large-sized quartz glass body, it is preferable that a more elongated mandrel with a less diameter is used and filling with more amount of silicon dioxide powder is performed. However, melt vitrification of a large amount of silicon dioxide powder filled creates a large stress, causing damages of the quartz glass mandrel, and the reduction of mandrel diameter is also limited from the viewpoint of its handling. In the case of ceramics and graphite, there exist problems similar to the case for the starting rod, heat-resisting substratum or mold base used in the production of optical fiber mother material. Furthermore, in the case of a C/C composite member, the larger its size is, the more serious the production problems such as synthesis or molding of the material, or problems of processing precision are. As a result, practical use of a member with a length exceeding 1,000 mm is very difficult.

Therefore, a first object of the present invention is to provide a mandrel without the aforementioned drawbacks, which is used for producing quartz glass.

A second object of the present invention is to provide a method for manufacturing an optical fiber mother material using the aforementioned mandrel for producing quartz glass.

A third object of the present invention is to provide a method for producing an optical fiber by heat-drawing an optical fiber mother material using the aforementioned mandrel for producing quartz glass.

A fourth object of the present invention is to provide production of a large sized quartz glass body using the aforementioned mandrel for producing quartz glass.

DISCLOSURE OF THE INVENTION

The present invention is a mandrel used for producing synthetic quartz glass body, the mandrel comprising integrated body consisting of at least two columnar or cylindrical C/C composite members joined in series by screw thread parts. The C/C composite rod is preferably carbon-impregnated and/or carbon-coated on the contact sides of the screw thread parts and is more preferably provided with C/C composite reinforcing members on the outer peripheries of the screw thread parts. In addition, the present invention is a method for producing an optical fiber mother material that involves forming a porous quartz glass mother material by depositing quartz glass fine particles obtained by flame-hydrolyzing a volatile silicon compound on the surface of the mandrel for producing quartz glass or on a quartz glass starting rod placed at the end of the mandrel, using the mandrel, and subsequently dehydrating and transparently vitrifying the mother material.

Also, the present invention is a method for producing an optical fiber that includes heat-drawing the optical fiber mother material produced as described above with the use of the aforementioned mandrel for producing quartz glass.

Furthermore, the present invention is a method for producing a large quartz glass body by means of the mold melt method using the aforementioned mandrel for producing quartz glass.

BEST MODE FOR CARRYING OUT THE INVENTION

In order to depict the present invention more in detail, it will be described in accordance with accompanying drawings.

Figure 1:
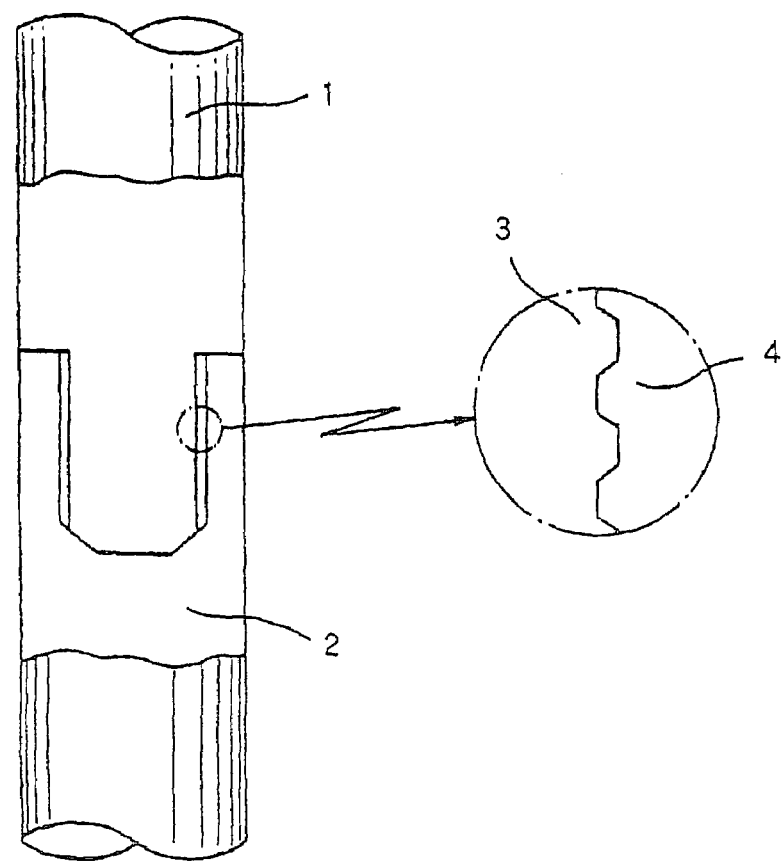
FIG. 1 is a schematic diagram of a joint of a mandrel for producing quartz glass of the present invention.
Figure 2:
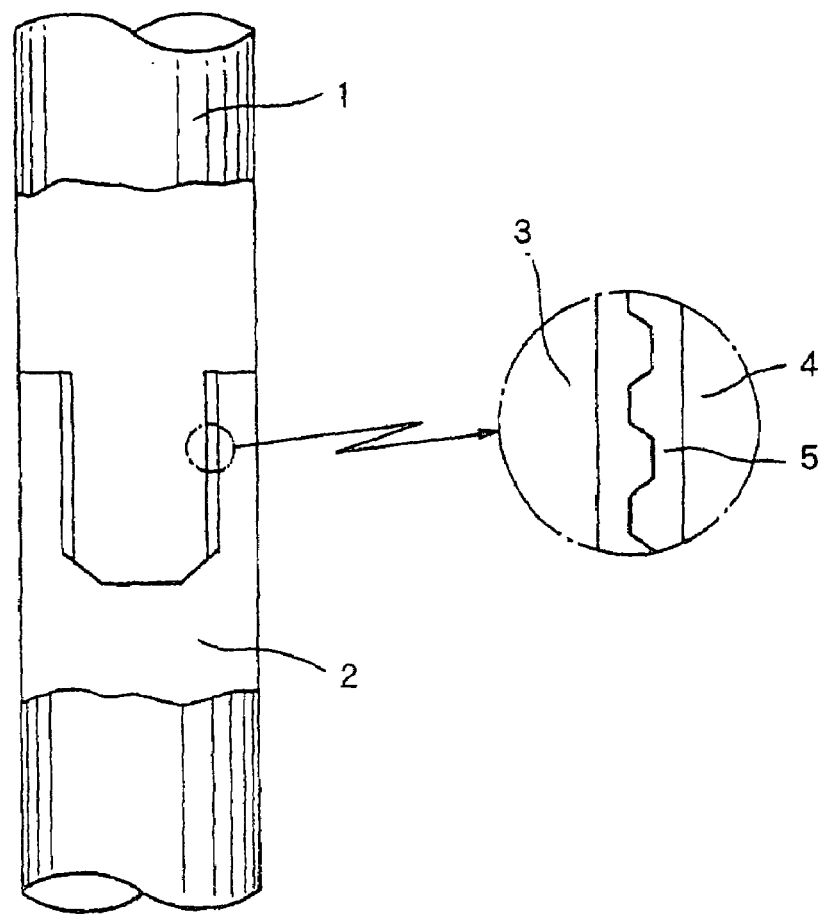
FIG. 2 is a schematic diagram of a joint of a mandrel for producing quartz glass having a layer that is carbon-impregnated and/or carbon-coated on the screw thread parts.
Figure 3:
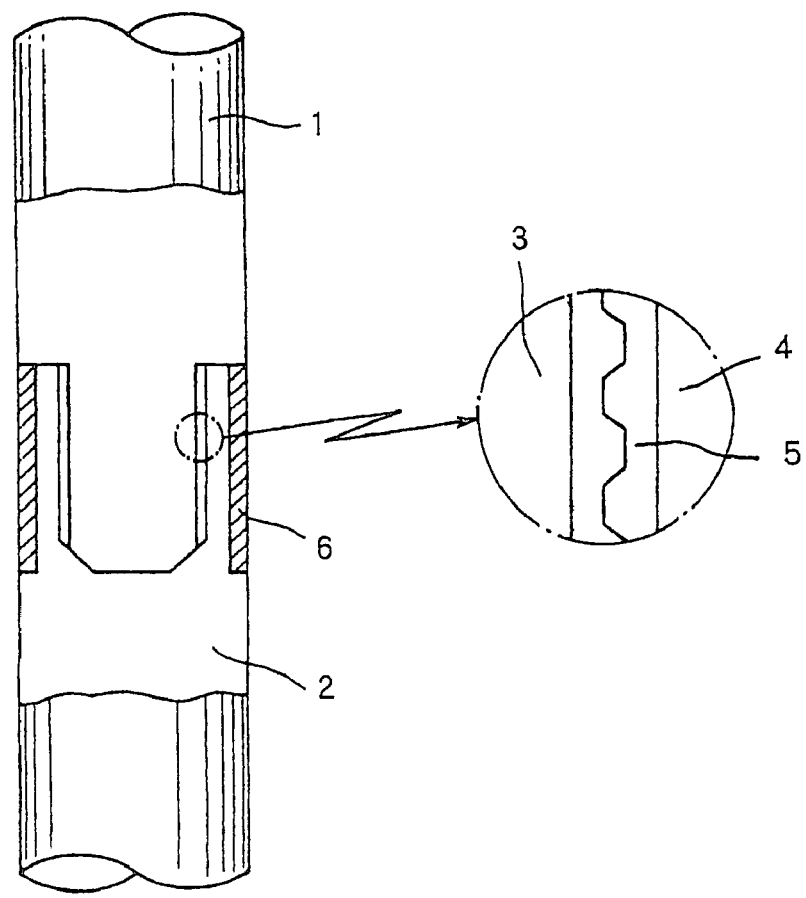
FIG. 3 is a schematic diagram of a joint of a mandrel for producing quartz glass, in which the joint is provided with reinforcing members on the outer peripheral surface of the screw thread parts.

FIG. 1 shows a mandrel for producing quartz glass, in which a C/C composite member is joined by a trapezoidal screw thread. In FIG. 1, reference numeral 1 is a C/C composite rod with a male screw thread on one side of the two ends, reference numeral 2 is a C/C composite rod with a female screw thread on one side of the two ends, reference numeral 3 is the male screw thread part of a C/C composite rod 1, and reference numeral 4 denotes a female screw thread part of a C/C composite rod 2. The C/C composite preferably has a bulk density of 1.5 g/cm³ or more, a bending strength of 100 MPa or more and a tensile strength of 100 MPa or more. C/C composites having properties below such ranges cannot provide adequate strength, and thus it is not preferable to use them as a mandrel supporting an elongated mother material or rod for a large optical fiber because of possible occurrences of damage etc. This C/C composite is formed in a shape of a flat plate, for example, by lamination of a plurality of pitch- or resin-impregnated prepregs on a carbon fiber cloth, and subsequent carbonization by burning, densification such as pitch- or resin-re-impregnating and ensuing burning, and graphitization, and further high purification using a halogen gas. Concentrations of impurities in a C/C composite, such as Na, K and Fe, are preferably 1 ppm or less. This can lower contamination with impurities and allows a synthetic quartz glass body of high purity to be provided. Thus, a good optical fiber with a small loss of transmission characteristics can be manufactured, for example, even when a quartz glass tube for an optical fiber mother material is fabricated. Further, as shown in FIG. 2, when the C/C composite rod is provided with a carbon-impregnated and/or carbon-coated layer 5 on the contact side of the screw thread part, the strength of the screw thread part is further increased, and thus the tensile strength at the rod of a 30 mm ø outside diameter reaches about 4 times as great as that of a graphite rod. As a result, even though a synthetic quartz glass body is large-sized and elongated in its length, or the mandrel itself is made smaller in diameter, the possibility of damage occurrence in the screw thread parts is further decreased. Moreover, if a reinforcing member 6 of a C/C composite is placed on the outer periphery of a screw thread part as illustrated in FIG. 3 in order to reinforce the screw thread part, the reinforcement of the screw thread joint is further enhanced, which can suppress thermal expansion and decrease in contact field of the screw thread part so as to ensure a further high load resistance. A C/C composite which forms this reinforcing member, is prepared by winding a prepreg, made for example by impregnating carbon fiber with pitch or resing, on a supporting body of a cylindrical shape and formed into a tubular shape. After that, a carbonization process, a densification process, a grafitization, a hyper purification process mentioned above are performed on thus formed body, then a layer, which has been impregnated and/or coated with carbon, is provided for completing the C/C composite. The reinforcing member may also be formed with a C/C composite which is not treated with the impregnation and/or the coating with carbon as mentioned above. The aforementioned carbon-impregnated and/or carbon-coated layer is formed on a C/C composite by means of CVI treatments and/or CVD treatments using a hydrocarbon gas or treatment by resin impregnation/coating, hardening and burning. Thus, it refers to (i) a layer formed through impregnation/coating of thermally decomposed carbon from the surface of a pore into the inside by CVI treatments or impregnation of material such as glass-like carbon by resin treatment etc. or (ii) a layer formed through coating of thermally decomposed carbon on the surface by CVD treatments or coating of material such as glass-like carbon on the surface by resin treatment etc. or (iii) impregnation/coating of thermally decomposed carbon from the surface of a pore into the inside by CVI treatments or impregnation of material such as glass-like carbon by resin treatment etc. and further coating of thermally decomposed carbon on that surface by CVD treatments or coating of material such as glass-like carbon on the surface by resin treatment etc. It should be noted that before or after the layer formation by the "impregnation" and "coating", mechanical surface treatment or finishing processing is usually performed in the industry, if necessary. Thus, since a mandrel for producing quartz glass of the present invention exhibits high heat resistance and load resistance, there are no deflections of the center during ascending/descending or rotation in handling or delivery even in the production of a large porous quartz glass mother material, so that a large synthetic quartz glass body can be produced with high preciseness in high productivity. In particular, when a quartz glass mother material is produced on a substratum with high heat resistance and compressibility such as ceramics, and after removing the substratum, mandrel for producing quartz glass of the present invention is inserted as a mold base, the thermal constraction during the preparation of a porous quartz glass mother material is reduced and the risk of breaking of the substratum is lowered, and, further, deterioration of the mandrel by high heat acids, etc. can be reduced, thus increasing the life of the mandrel itself.

Screw threads that join in series the aforementioned C/C composite at screw thread parts include a trapezoidal screw thread, triangular screw thread, square screw thread and saw tooth screw thread, and a trapezoidal screw thread is appropriate in that the screw thread has a section shape of a "trapezoid," which has a large area of contact between the male screw thread and female screw thread, by resin treatment etc. It should be noted that before or after the layer formation by the "impregnation" and "coating", mechanical surface treatment or finishing processing is usually performed in the industry, if necessary. Thus, since a mandrel for producing quartz glass of the present invention exhibits high heat resistance and load resistance, there are no deflections of the center during ascending/descending or rotation in handling or delivery even in the production of a large porous quartz glass mother material; so that a large synthetic quartz glass body can be produced with high preciseness in high productivity. In particular, when a quartz glass mother material is produced on a substratum with high heat resistance and compressibility such as ceramics, and after removing the substratum, mandrel for producing quartz glass of the present invention is inserted as a mold base, the thermal constraction during the preparation of a porous quartz glass mother material is reduced and the risk of breaking of the substratum is lowered, and, further, deterioration of the mandrel by high heat acids, etc. can be reduced, thus increasing the life of the mandrel itself.

Screw threads that join in series the aforementioned C/C composite at screw thread parts include a trapezoidal screw thread, triangular screw thread, square screw thread and saw tooth screw thread, and a trapezoidal screw thread is appropriate in that the screw thread has a section shape of a "trapezoid," which has a large area of contact between the male screw thread and female screw thread, shows high load resistance, and is excellent in easiness of thread processing, joining, etc.

When a mandrel for producing quartz glass of the present invention is used as a substratum etc. in the OVD method, withdrawal of the mandrel after vitrification in a vertical state may be facilitated by tapering the mandrel. This allows further cost reduction in that the contraction and movement of the mother material occurring during transparent vitrification of the porous quartz glass mother material can be suppressed so that a quartz glass body of higher precision can be produced.

Further, when a mandrel of the present invention is used as a mold base etc. for transparent vitrification of the porous quartz glass mother material, at least two cylindrical members may be joined in series to form a pipe-like mandrel. In case where a pipe-like mandrel is utilized, since high temperature gas can be passed through the hollow portion of the mandrel, it is possible to control the rates of dehydration treatment, transparent vitrification, etc. in such a way that, for example, the flow of a chlorine-containing gas (the similar kind to a chlorine-containing atmosphere outside)

through the inside of the mandrel promotes the dehydration even from the inside of a porous quartz glass mother material.

Quartz glass fine particles used for producing the aforementioned synthetic quartz glass body are manufactured by oxidation or flame-hydrolysis of a volatile silicon compound in an oxyhydrogen flame burner. Depositing these quartz glass fine particles on a columnar or cylindrical mandrel can produce a porous quartz glass mother material; then heat-vitrification of the porous quartz glass mother material can produce a large synthetic quartz glass body. Methods for forming the aforementioned porous quartz glass mother material include the VAD method and the OVD method, and in particular the OVD method allows both of the longitudinal and vertical manner to be carried out. However, the vertical manner is preferable when producing a large synthetic quartz glass body of a long length. In addition, volatile silicon compounds to be used include $SiCl_4$, $SiCl_3$, $(CH_3)$, $SiMe(OCH_3)_3$ and $SiClF_3$.

Figure 4:
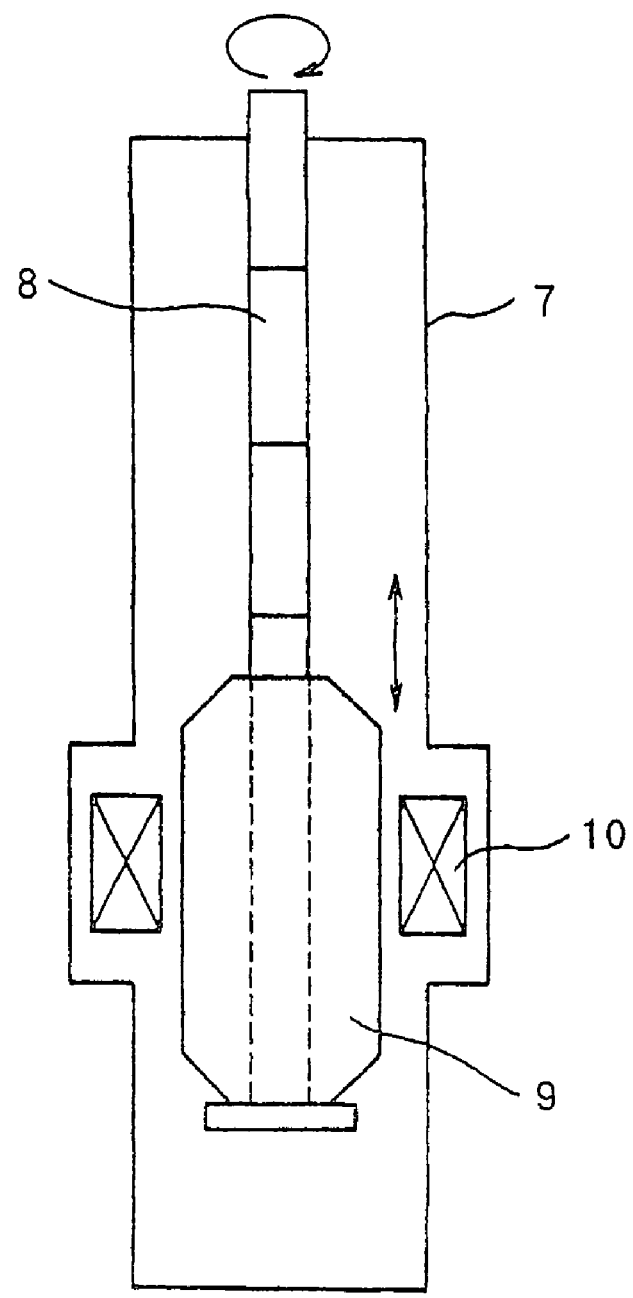
FIG. 4 is a schematic diagram illustrating an embodiment that carries out transparent vitrification by the zone melt method using a mandrel for producing quartz glass of the present invention.
Figure 5:
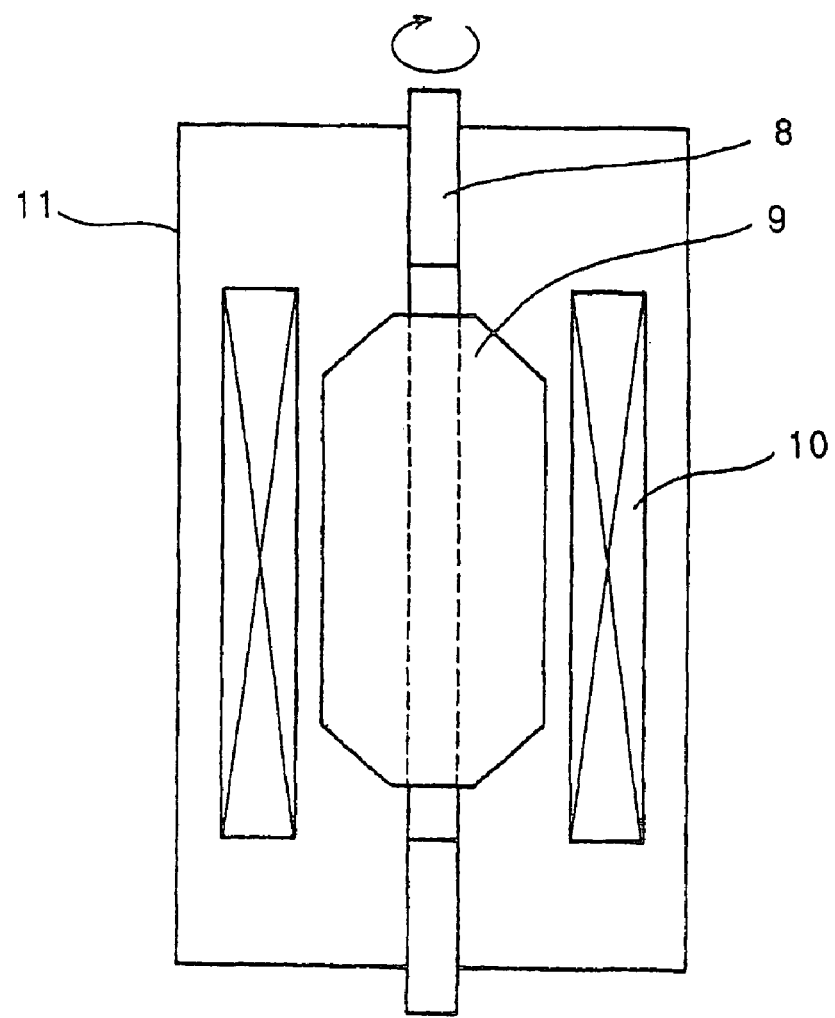
FIG. 5 is a schematic diagram illustrating an embodiment that carries out transparent vitrification by a stationary-type electric furnace using a mandrel for producing quartz glass of the present invention.

Methods to be used for dehydration treatment and burning (transparent vitrification) of a porous quartz glass mother material include the zone melt method that involves vertically holding the mother material and successively moving upward the heated zone from a lower position, as well as a method for the process in a stationary manner using an electric furnace with a wide heated zone. In particular, as a quartz glass body to be produced is increased in size, the load etc. during treatment or delivery is increased, and thus the above mentioned stationary heating method the heating method is useful. FIG. 4 illustrates an embodiment of transparent vitrification by the zone melt method using a mandrel for producing quartz glass of the present invention; similarly, FIG. 5 shows an embodiment of transparent vitrification by means of a stationary-type electric furnace 11 using a mandrel for producing quartz glass of the present invention. In FIGS. 4 and 5, reference numerals 7 and 11 denote an electric furnace, reference numeral 8 denotes a mandrel for producing quartz glass, reference numeral 9 a porous quartz glass mother material, and reference numeral 10 a heater.

Figure 6:
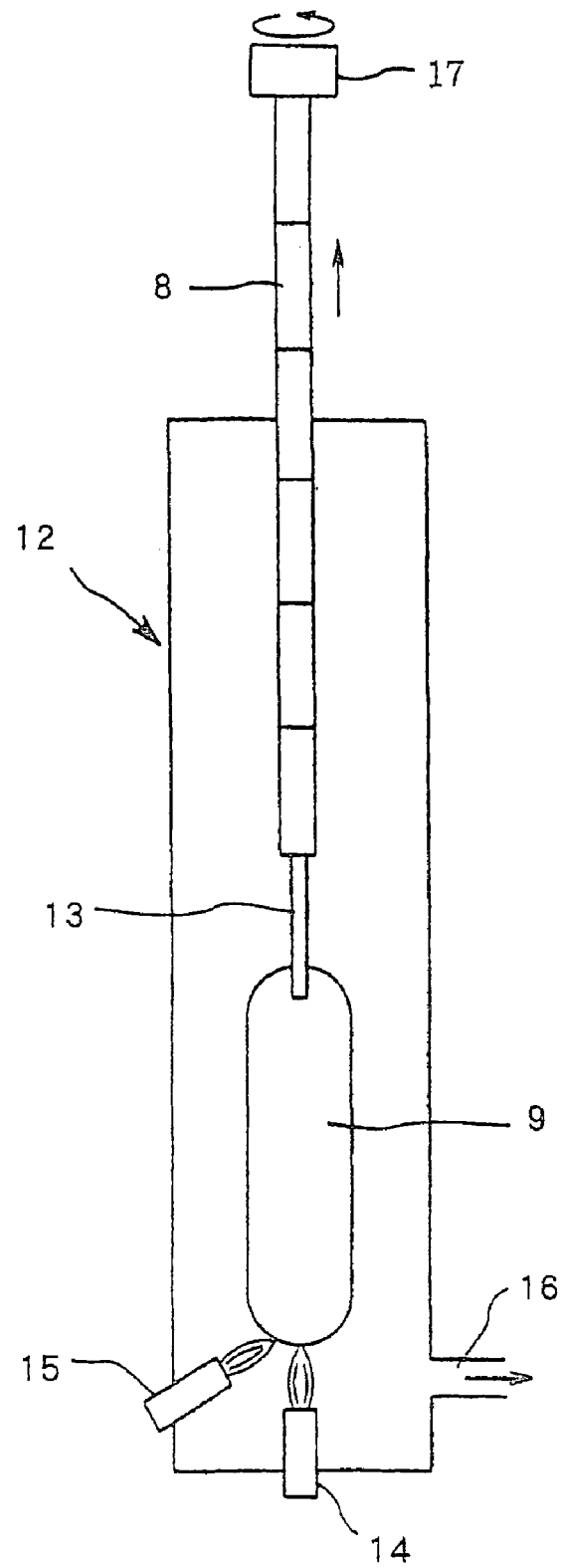
FIG. 6 is a schematic diagram of an apparatus for manufacturing a porous quartz glass mother material by the VAD method using a mandrel for producing quartz glass of the present invention.
Figure 7:
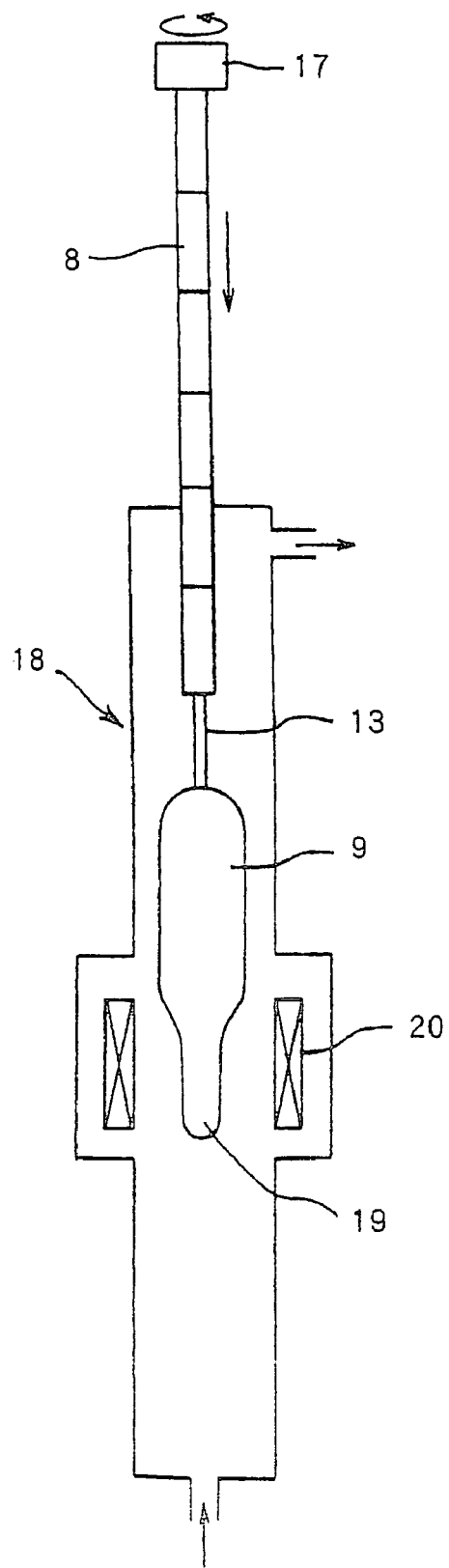
FIG. 7 is a schematic diagram of an apparatus for transparently vitrifying a porous quartz glass mother material obtained by the VAD method using a mandrel for producing quartz glass of the present invention.

FIGS. 6 and 7 are schematic diagrams of a method for producing an optical fiber mother material by the VAD method using a mandrel for producing quartz glass of the present invention. In FIG. 6, reference numeral 8 denotes a mandrel for producing quartz glass, reference numeral 9 the porous quartz glass mother material, reference numeral 12 an electric furnace, reference numeral 13 a quartz glass starting rod, reference numeral 14 a burner for forming a core, reference numeral 15 a burner for forming a clad, reference numeral 16 a gas outlet, and reference numeral 17 ascending and descending means. In addition, in FIG. 7, reference numeral 17 denotes the ascending and descending means, reference numeral 18 an electric furnace, reference numeral 19 an optical fiber mother material, and reference numeral 20 a heater.

Figure 8:
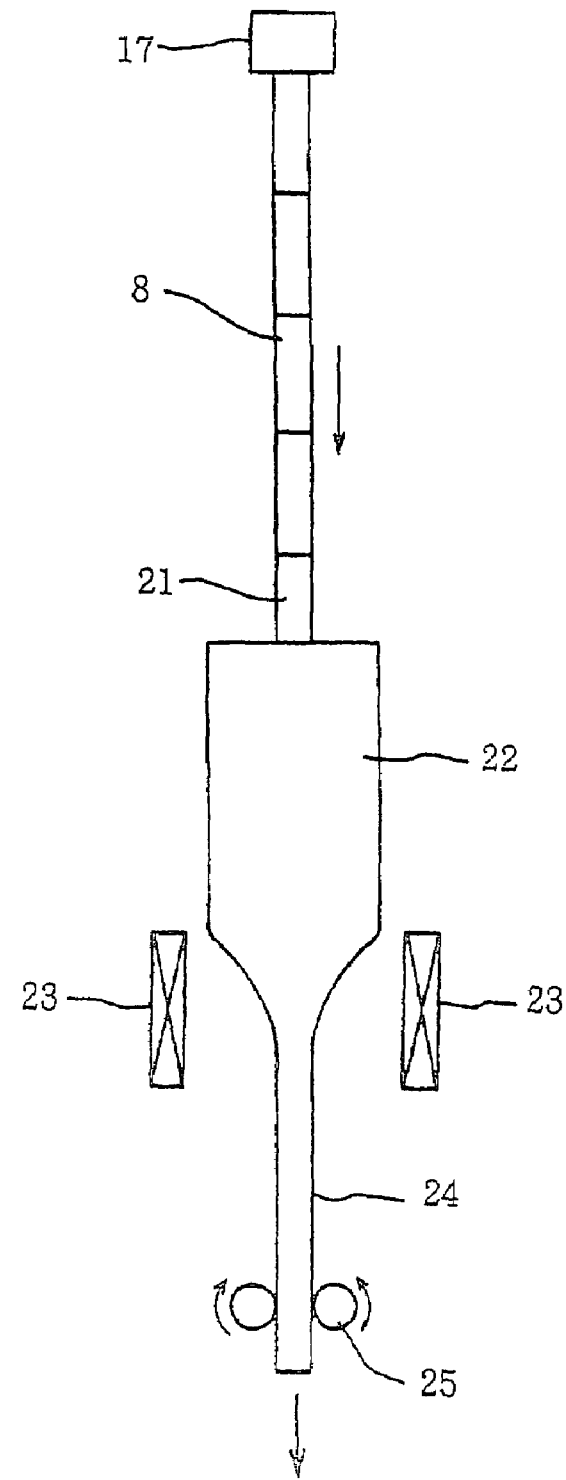
FIG. 8 is a schematic diagram of a heat-drawing apparatus using a mandrel for producing quartz glass of the present invention.
Figure 9:
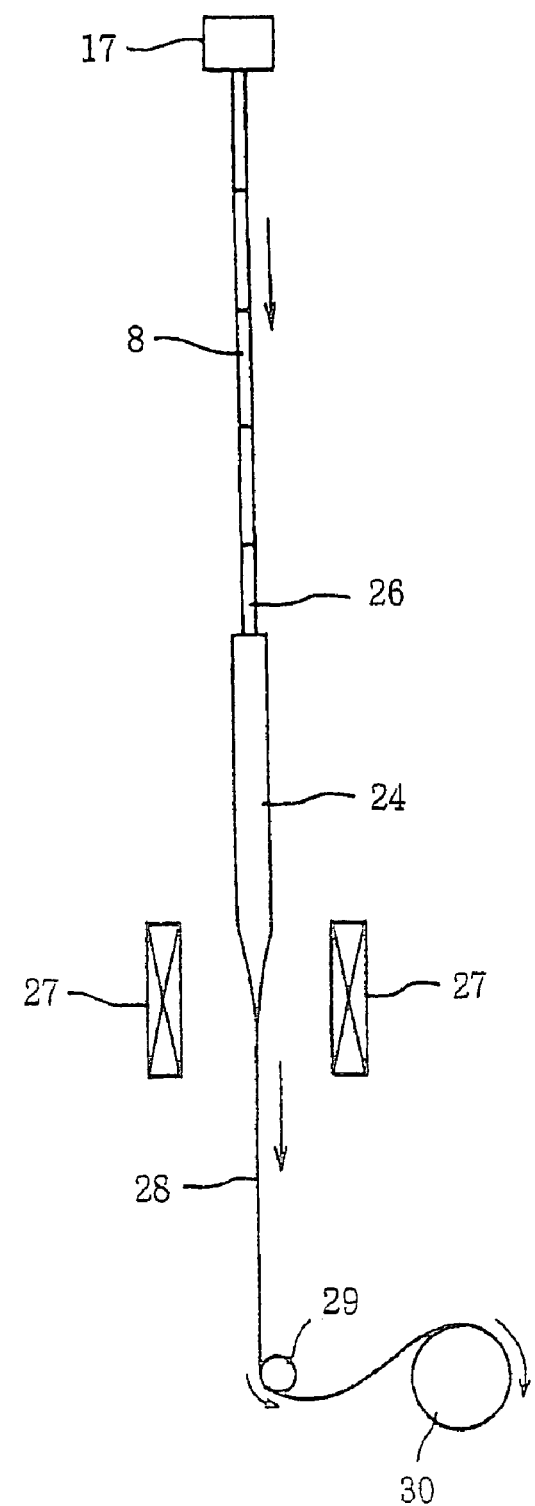
FIG. 9 is a schematic diagram of a drawing apparatus using a mandrel for producing quartz glass of the present invention.

An optical fiber is produced from an optical fiber mother material obtained by the aforementioned OVD method and VAD method by a step of producing a rod by heat-stretching, or a drawing step of drawing the rod to form an optical fiber, or through both of the steps. These steps are shown as schematic diagrams in FIGS. 8 and 9: FIG. 8 is a schematic diagram of a heat-stretching apparatus using a mandrel for producing quartz glass of the present invention and FIG. 9 is a schematic diagram of a drawing apparatus. In FIG. 8, reference numeral 8 denotes the mandrel for producing quartz glass, reference numeral 17 the ascending and descending means, reference numeral 21 a joint, reference numeral 22 an optical fiber mother material, reference numeral 23 a heater, reference numeral 24 an optical fiber rod, and reference numeral 25 a stretching roller. Also, in FIG. 9, reference numeral 24 denotes a rod, reference numeral 26 a joint, reference numeral 27 a heater, reference numeral 28 an optical fiber, reference numeral 29 a drawing roller, and reference numeral 30 a take-up drum.

Figure 10:
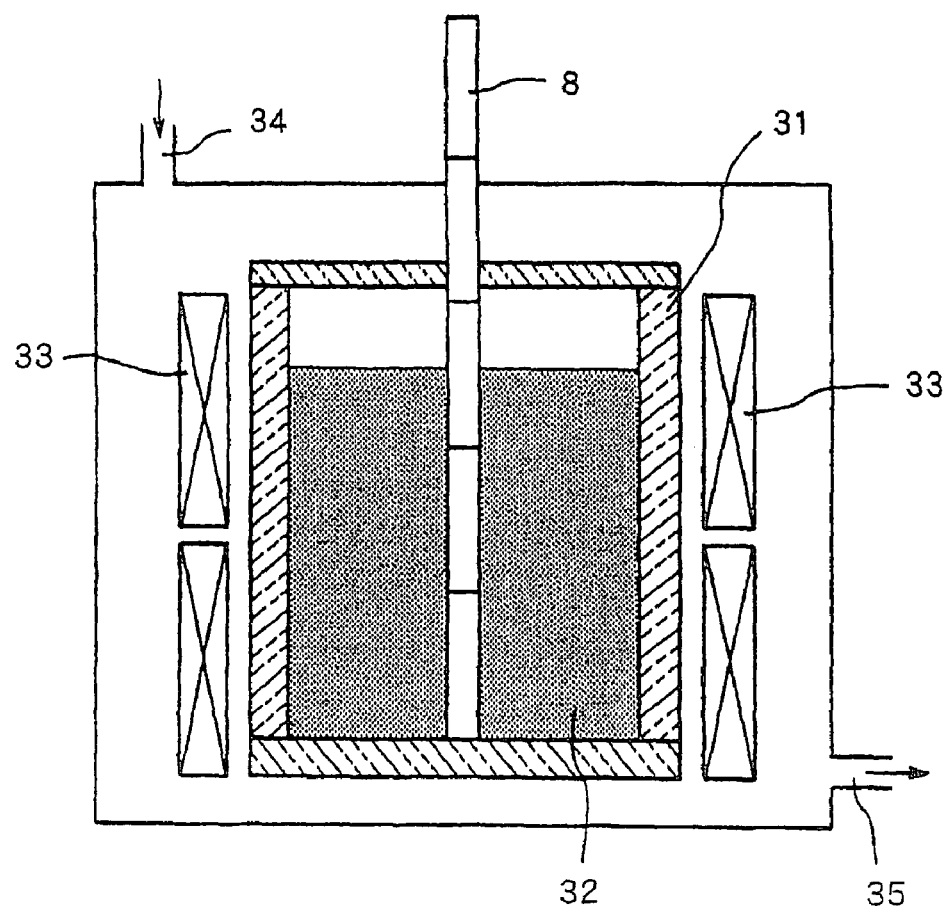
FIG. 10 is a schematic diagram when a silicon dioxide powder is filled into a heat-resisting mold using a mandrel for producing quartz glass of the present invention.

A mandrel for producing quartz glass of the present invention is disposed in the central portion of a carbon mold and a silicon dioxide powder is filled and then is melt-vitrified by a heating furnace to produce a large quartz glass body of high precision. Its schematic diagram is FIG. 10. In FIG. 10, reference numeral 8 denotes the mandrel for producing quartz glass, reference numeral 31 a heat-resisting mold, reference numeral 32 a silicon dioxide powder, reference numeral 33 a heater, reference numeral 34 an inert gas entrance, and reference numeral 35 an outlet.

In the production described above, to prevent the adhesion of the C/C composite mandrel to the quartz glass body and/or the adhesion of the heat-resisting mold to the quartz glass body, a graphite intermediate material is favorably inserted between the mandrel and the silicon dioxide powder and/or between the heat-resisting mold and the silicon dioxide powder. Specifically, the graphite intermediate material may be a graphite sheet and/or graphite felt. When a graphite sheet and/or graphite felt is coated to the outer periphery of a mandrel or the inner surface of the mold, adhesion of a mandrel and/or a mold to a quartz glass body can be prevented, and thus the quartz glass body can be easily withdrawn. This permits reuse of a C/C composite mandrel and a heat-resisting mold so that their lives may be increased. Moreover, such coating relieves stress associated with melt-vitrification of the silicon dioxide powder so as to prevent distortion and damage of the mold. Also, flexibility and gas permeability of the graphite can provide passage that releases outside, gas generated during vitrification, thus allowing bubbles remaining in the quartz glass body to further decrease. In addition, when a mandrel and a mold are coated with a graphite intermediate material in conducting the mold melt method, either of a graphite sheet and graphite felt may be used as the graphite intermediate material, or a graphite sheet is further coated over a coated graphite felt may be used. For example, as disclosed in Japanese Patent Laid-Open No. 11-278857, different materials may be used for the bottom and the side of a mold.

A suitable silicon dioxide powder to be used can be selected based on applications, cost, etc. 15. In view of cost, for example, a preferable silicon dioxide powder used for a quartz glass body for a semiconductor jig, which requires a high purity of a given level or more as well as a high heat resistance, is a powder obtained by purifying a crystalline silica powder that is acquired by grinding natural quartz (crystal), silica sand, silica stone, or the like. An amorphous silica powder obtained by melting these materials can also be utilized. In addition, when a powder of a higher purity is required, for example, in the case where a cylinder-shaped quartz glass body is fabricated for the production of an optical fiber mother material, a synthetic quartz glass powder is preferably used that is obtained by the sol gel method, the soot method, the flame combustion method, or the like from a starting material of a silicon compound, such as a silicon alkoxide, a halogenated silicon (silicon tetrachloride etc.), or sodium silicate. Fumed silica, precipitated silica, etc. can also be utilized.

The size of the crystalline or amorphous silicon dioxide powder may be selected based on heating/melting conditions etc. and, as preferably, the particle size ranges from 1 to 1,000 μm, and more preferably the size is in the range of 10 to 300 μm. However, it is desirably that no silicon dioxide powder with a size exceeding 1,000 μm is used since too large size of silicon dioxide powder decreases the filling density of the powder resulting in more difficulty in uniform vitrification so that a homogeneous quartz glass body can not be provide. Additionally, too small particle size may cause a problem in handling, and therefore it is desirable not to use a silicon dioxide powder with a particle size under 1 μm. In particular, when a synthetic quartz glass powder is used, the tendency for the bubbles to remain is enhanced due to the faster melting of the powder, resulting in an increase in the number of bubbles contained. Thus, in this case, it is desirable that a powder of a relatively large particle size is used. Also, it is preferable to optionally use natural or synthetic or crystalline or amorphous silicon dioxide powder, or the like based on its applications etc. Specifically, a suitable powder can be selected from a natural quartz powder, natural quartz glass powder, synthetic quartz glass powder and synthetic quartz powder. Moreover, powders doped with elements (aluminum, nitrogen, hydrogen, etc.) having specific functions (for improvement of heat resistance, improvement of light permeability, etc.) can be used as the aforementioned various powers. Furthermore, in terms of controlling the filling density and melt speed of the aforementioned silicon dioxide powders etc., mixing or combination of the above-mentioned various silicon dioxide powders is also effective. For example, in the particle diameter range of 1 to 1,000 μm, mixing of quartz powders of different particle sizes to some extent can improve the filling density to facilitate uniform melt vitrification. In addition, filling of a quartz glass powder in the inside a mold (in the vicinity of the central part) and filling of a quartz powder outside (in the vicinity of the outer periphery) can prevent too fast melting in the outside so as to reduce the containing of bubbles.

As heating, melting conditions for the aforementioned silicon dioxide powders, for example, the conditions disclosed in Japanese Patent Laid-Open No. 9-202632 are preferably employed. Specifically, the silicon dioxide powders is heated a ramping rates of temperature of:

200 to 600° C./hour for the temperature range of room temperature to 1,600° C. and 10 to 100° C./hour for the temperature range of 1,600° C. to the melting temperature of the quartz powder, with each 5 cm in thickness of the filled silicon dioxide powder layer being heated at least 30 minutes, and is heat-melted while discharging gas in the filled silicon dioxide powder. After the heat-melting of the powder, it is kept for at least 2 hours, preferably for 3 to 5 hours, at the aforementioned melting temperature while an innert gas is introduced to break the vacuum so as to pressurize at 0.5 to 3 atmospheric. Employment of the aforementioned melting conditions can reduce the bubbles remaining in a quartz glass body even if the quartz body is large-sized. Further preferably, when the aforementioned C/C composite mandrel is made cylindrical and is melted while discharging gas from its hollow portion, the remaining of the bubbles can further be restrained.

Although the above description is made on the premise that a transparent quartz glass body is to be produced, the manufacturing method of the present invention can be applied even when an opaque quartz glass body of heat shielding and light shielding properties to be produced. In this case, some processes may be employed such as adding a blowing agent to a filled silicon dioxide powder and optionally changing the temperature profile during the heating.

The present invention will be described specifically in accordance with examples hereinafter; however, the invention is not limited to these examples.

EXAMPLE 1

6K plain fabric cloth of carbon fiber (Toreca T-300) available from Toray Industries, Inc. was impregnated with phenol resin to produce a prepreg, which was shred to a size of about 820 mm×410 mm and laminated and then was hot press molded at 160° C. to yield a molding with a size of about 820 mm×410 mm×35 mm. This molding was heated to 800° C. in a furnace to provide a burned body. This burned body was repeatedly pitch-impregnated and burned for densification and then was heat treated at 2,000° C. to obtain a planar C/C composite of about 820 mm 410 mm×35 mm. The values of the physical properties of this C/C composite plate determined were 1.62 g/cm³ for the bulk density, 155 MPa for the bending strength and 220 MPa for the tensile strength. From this plate, 12 columnar rods of 800 mm in length and 30 mm ø in diameter were fabricated. With two rods of them, one had a trapezoidal male screw thread formed by grinding an outer periphery from an end thereof to the position 50 mm distant from the end and the other had a trapezoidal female screw thread formed by grinding the inner periphery of an end thereof. These two rods were highly purified using a halogen gas and then were joined in series to provide a C/C composite mandrel with a length of 1,550 mm and a diameter of 30 mm ø. The mandrel thus obtained was placed on a tensile test apparatus and the breaking weight was measured via static tensile weight with a modified speed of 0.5 mm/min. As a result, the screw thread was broken at a breaking weight of 14,200 N (newtons).

Also, for the ten remaining rods, trapezoidal male screw threads and trapezoidal female screw threads were fabricated as described above. (Here, among the ten rods, one rod only had a male screw thread at an end thereof, each of other eight rods had a male screw thread at an end thereof and a female screw thread at the other end, and the other one only had a female screw thread at an end thereof) and then high purification treatment with a halogen gas was carried out on them. Then, these ten rods were joined at nine sites as mentioned above by using the male screw threads and female screw threads to provide a C/C composite mandrel A of 7,550 mm in length and 30 mm ø in diameter as illustrated in FIG. 1.

Thereafter, gaseous silicon tetrachloride (SiCl₄) was flame-hydrolyzed by the OVD method using an oxyhydrogen flame burner to deposit quartz glass fine particles on an alumina substratum, thereby obtaining a porous quartz glass mother material with a weight of about 300 kg. The alumina substratum was withdrawn from this porous quartz glass mother material and the aforementioned C/C composite mandrel A was inserted as a mold base into the hole formed by the withdrawal in the porous quartz glass mother material. A holding jig etc. were disposed to maintain vertical the porous quartz glass mother material. The mother material, kept in this status, was set in the upper part within the electric furnace shown in FIG. 4, and the furnace was heated to 1,550° C. Thereafter, the mother material was lowered in the furnace and was transparently vitrified by the zone melt method. The synthetic quartz glass hollow body thus obtained had no eccentricity and had good size precision and surface conditions and thus was well suited as a tube for an optical fiber mother material.

EXAMPLE 2

As with Example 1, there were fabricated 12 columnar rods of 800 mm in length and 30 mm ø in diameter. Among two rods of them, one rod had a trapezoidal male screw thread formed by grinding the outer periphery from an end thereof to the position 50 mm distant from the end, and the other one had a trapezoidal female screw thread formed by grinding the inner periphery of an end thereof. These two rods, with the screw thread part formed thereon, were highly purified using a halogen gas and then were placed in a vapor deposition furnace to be subjected to impregnation and coating of thermally decomposed carbon by CVI treatment. Then, these two rods were joined in series to provide a C/C composite mandrel with a length of 1,550 mm and a diameter of 30 mm ø. The mandrel thus obtained was subjected to breaking weight measurement by static tensile weight as in the case of Example 1. As a result, the screw thread was broken at a breaking weight of 16,700 N.

Furthermore, the ten remaining rods were subjected to high purification treatment using a halogen gas, followed by impregnation and coating of thermally decomposed carbon on the screw thread parts by CVI treatment as described previously. Then, ten rods were joined at nine sites by using the trapezoidal male screw thread and female screw thread to provide a C/C composite mandrel B of 7,550 mm in length and 30 mm ø in diameter as illustrated in FIG. 2.

Thereafter, using the aforementioned C/C composite mandrel B as a substratum, gaseous silicon tetrachloride (SiCl$_4$) was flame-hydrolyzed by the OVD method using an oxyhydrogen flame burner to deposit quartz glass fine particles on the mandrel B, thereby obtaining a porous quartz glass mother material with a weight of about 300 kg. The mother material, kept in this status, was delivered and set in the stationary-type electric furnace at 1,550° C. shown in FIG. 5 and was subjected to transparent vitrification. The synthetic quartz glass hollow body thus obtained had no eccentricity and had good size precision and surface conditions and thus was well suited as a tube for an optical fiber mother material.

EXAMPLE 3

As with Example 1, there were fabricated 12 columnar rods of 800 mm in length and 30 mm ø in diameter. Among two rods of them, one rod had a trapezoidal male screw thread formed by grinding the outer periphery from an end thereof to the position 50 mm distant from the end, and the other one had a trapezoidal female screw thread formed by grinding the inner periphery of an end thereof. Then, the outer periphery of the screw thread part was cut by 1 mm in depth and 30 mm in length. This cutting was made for attaching a tubular shape reinforcing member made of a C/C composite to thus cut part for reinforcing in the circumference. The two rods on which the screw thread parts had been formed were subjected to high purification treatment using a halogen gas, and then were put in a vapor deposition furnace to impregnate and coat thermally decomposed carbon by CVI treatment. The two rods were joined in series to provide a C/C composite mandrel of 1,550 mm in length and 30 mm ø in diameter. The aforementioned reinforcing member was obtained by forming in a cylindrical shape the 12K filament, a carbon fiber available from Toray Industries Inc. (Toreca T-300), while impregnating a phenol resin by a filament winding apparatus, densifying the molding by repeating pitch impregnation and burning several times and subsequently heat treating at 2,000° C. This cylinder-shaped article was cut to 20 mm in width, into the inside of which a two-way split metal jig was inserted and the tensile strength was determined using a tensil test apparatus by means of a method of pulling up and down, resulting in the strength of 300 MPa. The outer and inner diameters as well as its length of this reinforcing member was tailored such that the reinforcing member matches the cut part in the outer circumference of the female screw thread part of a mandrel made with a C/C composite, then the member was fitted to the cut part of the outer circumference of the emale screw thread part in an inserting manner as shown in FIG. 3. This reinforcing member was further subjected to high purification treatment using a halogen gas and impregnation and coating of thermally decomposed carbon as in the case of Example 2. The C/C composite mandrel thus obtained was subjected to breaking weight measurement by static tensile weight as in the case of Example 1. As a result, the screw thread was broken at a breaking weight of 21,000 N.

Furthermore, the ten remaining rods were subjected to high purification treatment using a halogen gas, followed by impregnation and coating of thermally decomposed carbon on the screw thread parts by CVI treatment as described previously. Then, the ten rods were joined at nine sites by using the trapezoidal male screw thread and the trapezoidal female screw thread provided a cylindrical C/C composite reinforcing member as described above to provide a C/C composite mandrel C of 7,550 mm in length and 30 mm ø in diameter as illustrated in FIG. 3.

Thereafter, a quartz glass starting rod was placed on the aforementioned C/C composite mandrel C and gaseous silicon tetrachloride (SiCl$_4$) was flame-hydrolyzed by the VAD method using an oxyhydrogen flame burner to grow quartz glass fine particles in the axial direction of the mandrel C, thereby obtaining a porous quartz glass mother material with a weight of about 300 kg. The mother material, kept in this status, was delivered and set in the stationary-type electric furnace at 1,550° C. shown in FIG. 5 and was subjected to transparent vitrification. The synthetic quartz glass hollow body thus obtained had no eccentricity and had good size precision and surface conditions and thus was well suited as a tube for an optical fiber mother material.

EXAMPLE 4

As with Example 1, there were fabricated 12 columnar rods of 800 mm in length and 30 mm ø in diameter. Into these 12 rods, trapezoidal male screw threads and trapezoidal female screw threads were formed. The outer peripheries of the female screw thread parts like in the Example 3 were provided with C/C composite reinforcing members. All the rods were subjected to high purification treatment, followed by impregnation and coating of thermally decomposed carbon. The twelve rods were joined at eleven sites using the trapezoidal male screw threads and the trapezoidal female screw threads equipped with reinforcing members to obtain a C/C composite mandrel D of 9,050 mm in length and 30 mm ø in diameter.

Then, using the aforementioned C/C composite mandrel D as a substratum, a porous quartz glass mother material with both a large outside diameter (namely, thick wall) and a high density and a weight of about 900 kg was held, transported to and set in an electric furnace at 1,550° C. to be transparently vitrified. The synthetic quartz glass hollow body thus obtained had no eccentricity and had good size precision and surface conditions and thus was well suited as a tube for an optical fiber mother material.

From the statuses of this handling and the measurements of a tensile strength in Example 3, the mandrel of the present example was confirmed to be sufficiently able to hold and transport a porous quartz glass mother material of 900 kg.

EXAMPLE 5

A porous quartz glass mother material 9 with both a large outside diameter (namely, thick wall) and a high density and a weight of about 900 kg was obtained by placing a quartz glass starting rod 13 mounted at the end of the C/C composite mandrel D in Example 4 by means of the VAD method shown in FIG. 6. The mother material 9, kept in this status, was delivered and vertically set within the electric furnace 18 shown in FIG. 7. The mother material was heated to a temperature of 1,550° C. in a vacuum and then dehydrated and transparently vitrified to yield a synthetic quartz glass body for an optical fiber mother material. The synthetic quartz glass body thus obtained had no eccentricity and had good size precision and surface conditions and thus was well suited for an optical fiber mother material.

EXAMPLE 6

The aforementioned optical fiber mother material was fixed to a joint 21 of the end of a mandrel for the production of an optical fiber as shown in FIG. 8 and then was set within a heat-stretching furnace. The mother material was heated to 1,930° C. by a heater 23 while flushing an inert gas and was stretched by a stretching roller 25 to form a rod 24 of 40 mm in diameter for an optical fiber. During the stretching the center was not deflected and the rod thus obtained did not show eccentricity. The rod was hung through the mandrel D and was set in the drawing apparatus illustrated in FIG. 9. An optical fiber 28 was drawn by a drawing roller 29 and was taken up on a take-up drum 30. The optical fiber thus obtained did not offer any eccentricity.

COMPARATIVE EXAMPLE 1

Twelve columnar rods of 800 mm in length and 30 mm ø in diameter were fabricated from high-purity isotropic high-density graphite (trade name ISO-630, available from Toyo Tanso Co., Ltd.). Two rods of them were joined in series by using the trapezoidal male screw threads and trapezoidal female screw threads to provide a high-purity isotropic high-density graphite mandrel of 1,550 mm in length and 30 mm ø in diameter. The high-purity isotropic high-density graphite used had a bulk density of 1.82 g/cm$^3$, a tensile strength of 53.9 MPa and an ash content of 10 ppm or less. The mandrel thus obtained was subjected to breaking weight measurement by static tensile weight as in the case of Example 1. As a result, the screw thread was broken at a breaking weight of 3,900 N.

Furthermore, the remaining 10 rods were subjected to high purification treatment and then were joined at nine sites by using the trapezoidal male screw threads and trapezoidal female screw threads to provide a high-purity isotropic high-density graphite mandrel E of 7,550 mm in length and 30 mm ø in diameter.

Thereafter, gaseous silicon tetrachloride (SiCl$_4$) was flame-hydrolyzed by the OVD method using an oxyhydrogen flame burner to deposit quartz glass fine particles on an alumina substratum, thereby obtaining a porous quartz glass mother material with a weight of about 300 kg. The alumina substratum was withdrawn from this porous quartz glass mother material and the aforementioned high-purity isotropic high-density graphite mandrel E was inserted as a mold base into the hole made by the withdrawal in the porous quartz glass mother material. A holding jig etc. were disposed to maintain vertical the porous quartz glass mother material. The mother material, kept in this status, was set in the upper part within the electric furnace, and the furnace was heated to 1,550° C. Thereafter, when the mother material was lowered in the furnace and was attempted to be transparently vitrified by the zone melt method, sliding occurred on the screw thread parts, causing the porous quartz glass mother material to fall. A transparent synthetic quartz glass hollow body was not obtained.

COMPARATIVE EXAMPLE 2

Figure 11:
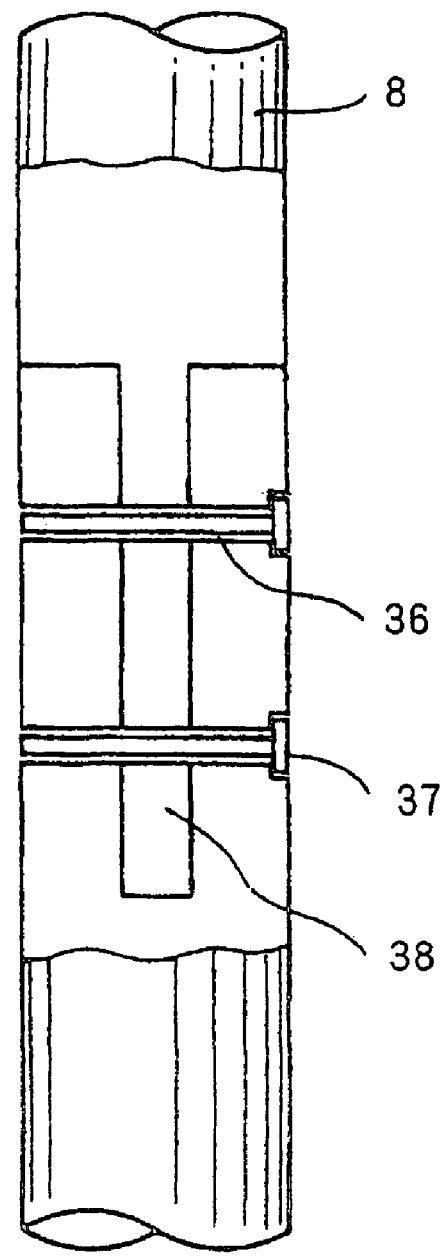
FIG. 11 is a schematic diagram of a joint of a conventional mandrel for producing quartz glass, the joint joined by pin fixing in series.

Twelve columnar rods of 800 mm in length and 30 mm ø in like in Example 1 diameter were fabricated. Then, with two rods of them, a slit 38 was made at the end of a columnar rod as shown in FIG. 11, and the other columnar rod was inserted into it. Pin inserting holes 36 were made and pins 37 were inserted into them to fix the two rods, thus obtaining a C/C composite mandrel of 1,550 mm in length and 30 mm ø in diameter. The mandrel thus obtained was subjected to breaking weight measurement by static tensile weight as in the case of Example 1. As a result, the pin was broken at a breaking weight of 9,500 N. Furthermore, the remaining 10 rods were subjected to high purification treatment and then were joined at nine sites by means of pin fixing to provide a C/C composite mandrel F of 7,550 mm in length and 30 mm ø in diameter.

Thereafter, using the aforementioned C/C composite mandrel F as a substratum, gaseous silicon tetrachloride (SiCl$_4$) was flame-hydrolyzed by the OVD method using an oxyhydrogen flame burner to deposit quartz glass fine particles on the mandrel F, thereby obtaining a porous quartz glass mother material with a weight of about 300 kg. In this mother material, bending of the mandrel had been generated in the pin fixing portions, which caused distortion of the porous quartz glass mother material. For this reason, a high-precision synthetic quartz glass hollow body could not be produced.

EXAMPLE 7

As with the C/C composite mandrel A of Example 1, there were fabricated 12 columnar rods of 800 mm in length and 30 mm ø in diameter. Among two rods of them, one rod had a trapezoidal male screw thread formed by grinding the outer periphery from an end thereof to the position 50 mm distant from the end, and the other one had a trapezoidal female screw thread formed by grinding the inner periphery of an end thereof. These two rods were highly purified using a halogen gas and then were joined in series to provide a C/C composite mandrel with a length of 1,550 mm and a diameter of 30 mm ø. The mandrel thus obtained was subjected to breaking weight measurement by static tensile weight as in the case of Example 1. As a result, the screw thread was broken at a breaking weight of 14,200 N. It was confirmed that the joint has sufficient strength.

Also, for the ten remaining rods, trapezoidal male screw threads and trapezoidal female screw threads were fabricated as described above and then high purification treatment with a halogen gas was carried out on them. Then, these ten rods were joined at nine sites as mentioned above by using the male screw threads and female screw threads to provide a C/C composite mandrel G of 7,550 mm in length and 30 mm ø in diameter.

The aforementioned C/C composite mandrel G was disposed in the center of a cylindrical carbon mold 31 of 155 mm ø in inside diameter and 1,000 mm in length as illustrated in FIG. 10 and then was filled with a quartz powder 32 (with a total metal impurity of 30 ppm or less, a particle size distribution of 60 to 280 gm and an average particle diameter of 180 μm) to a height of about 950 mm while applying vibration to the powder. The density of the aforementioned filled material was about 1.45 g/cm$^3$. The overall carbon mold was set in a vacuum furnace, and the pressure was decreased to a vacuum degree of $1.33\times10^{-2}$ Pa($1\times10^{-4}$ mmHg) or less, then heating was started. A carbon resistance heater 33 was used as a heat source and the material was heated from room temperature to 1,780° C. over 7 hours while measuring the temperature using a thermocouple. It was maintained at 1,780° C. for two hours and then the vacuum in the furnace was broken with nitrogen gas to the atmospheric pressure. Then, after maintaining the atmospheric pressure to until the completion of the melting and gradual cooling, a large quartz glass body of a hollow cylinder shape was provided. The quartz glass hollow body thus obtained had no content of bubbles and had no bending and no eccentricity and had good size precision and thus was well suited for an optical fiber mother material.

EXAMPLE 8

As with the C/C composite mandrel B in Example 2, there were fabricated 12 columnar rods of 800 mm in length and 30 mm ø in diameter. Among two rods of them, one rod had a trapezoidal male screw thread formed by grinding the outer periphery from an end thereof to the position 50 mm distant from the end, and the other one had a trapezoidal female screw thread formed by grinding the inner periphery of an end thereof. These two rods, with a screw thread part formed thereon, were highly purified using a halogen gas and then were placed in a vapor deposition furnace to be subjected to impregnation and coating of thermally decomposed carbon by CVI treatment. Then, these two rods were joined in series to provide a C/C composite mandrel with a length of 1,550 mm and a diameter of 30 mm ø. The mandrel thus obtained was subjected to breaking weight measurement by static tensile weight as in the case of Example 1. As a result, the screw thread was broken at a breaking weight of 16,700 N. It was confirmed that the mandrel has further higher strength than the one in Example 7.

Furthermore, the ten remaining rods were subjected to high purification treatment using a halogen gas, followed by impregnation and coating of thermally decomposed carbon on the screw portions by CVI treatment as described previously. Then, the ten rods were joined at nine sites by using the male screw thread and female screw thread to provide a C/C composite mandrel of 7, 550 min in length and 30 mm ø in diameter. The aforementioned C/C composite mandrel was coated with a graphite sheet on its outer periphery and the mandrel H was placed in the center of a cylindrical carbon mold shown in FIG. 10. Then, the mold was filled with a quartz powder (with a total metal impurity of 30 ppm or less, a particle size distribution of 60 to 280 μm and an average particle diameter of 180 μm) with vibration to a height of about 950 mm. The overall carbon mold filled with this quartz powder was heated in a vacuum furnace under the conditions of Example 7 to produce a large quartz glass body of a hollow cylinder shape. The quartz glass hollow body thus obtained had no content of bubbles and had no bending and no eccentricity and had good size precision and thus was well suited for an optical fiber mother material. In addition, in the graphite sheet-removed C/C composite mandrel H, degradation such as deterioration was not observed on its surface, and so it seemed to be able to be repeatedly used.

EXAMPLE 9

As with the C/C composite mandrel C of Example 3, there were fabricated 12 columnar rods of 800 mm in length and 30 mm ø in diameter. Among two rods of them, one rod had a trapezoidal male screw thread formed by grinding the outer periphery from an end thereof to the position 50 mm distant from the end, and the other one had a trapezoidal female screw thread formed by grinding the inner periphery of an end. Then, the outer periphery of the female screw thread part was cut by 1 mm in depth and 30 mm in length. This cutting was made for attaching a tubular shape reinforcing member made of a C/C composite to thus cut part for reinforcing in the circumference. The two rods on which the screw thread parts had been formed were subjected to high purification treatment using a halogen gas, and then were put in a vapor deposition furnace to impregnate and coat thermally decomposed carbon by CVI treatment. The two rods were joined in series to provide a C/C composite mandrel of 1,550 mm in length and 30 mm ø in diameter. The aforementioned reinforcing member was obtained by forming in a cylindrical shape the 12K filament, or carbon fiber available from Toray Toray Industries Inc. (Toreca T-300), while impregnating a phenol resin by a filament winding apparatus, densifying the molding by repeating pitch impregnation and burning several times and subsequently heat treating at 2,000° C. This cylinder-shaped article was cut to 20 mm in width, into the inside of which a two-way split metal jig was inserted and the tensile strength was determined using a tensile test apparatus by means of a method of pulling up and down, resulting in the strength of 300 MPa. The outer and inner diameters as well as its length of this reinforcing member was tailored such that the member matches the cut part in the outer circumference of the female screw thread part of a mandrel made with C/C composite, then the member was fitted to the cut part of the outer circumference of the female screw thread part in an inserting manner as shown in FIG. 3. This reinforcing member further was subjected to high purification treatment using a halogen gas and impregnation and coating of thermally decomposed carbon. The C/C composite mandrel thus obtained was subjected to breaking weight measurement by static tensile weight as in the case of Example 1. As a result, the screw thread was broken at a breaking weight of 21,000 N. It was confirmed that the mandrel has further higher strength than the one in Example 8.

Furthermore, the ten remaining rods were subjected to high purification treatment using a halogen gas, followed by impregnation and coating of thermally decomposed carbon on the screw thread parts by CVI treatment as described previously. Then, ten rods were joined at nine sites by using a trapezoidal male screw thread and a trapezoidal female screw thread provided with a cylindrical C/C composite reinforcing member as described above to give a C/C composite mandrel I of 7,550 mm in length and 30 mm ø in diameter. The inner wall surface of a cylindrical carbon mold in FIG. 10 was covered with graphite felt and the aforementioned C/C composite mandrel I was disposed in the center of the mold. Then, the mold was filled with a quartz powder (with a total metal impurity of 30 ppm or less, a particle size distribution of 60 to 280 μm and an average particle diameter of 180 μm) to a height of about 950 mm while applying vibration to the powder. The overall carbon mold filled with this quartz powder was heated in a vacuum furnace under the conditions of Example 7 to produce a large quartz glass body of a hollow cylinder shape. The quartz glass hollow body thus obtained had no content of bubbles and had no bending and no eccentricity and had good size precision and thus was well suited for an optical fiber mother material. In the inner wall of the carbon mold, the inner coat of the graphite felt removed, degradation such as deterioration was not observed on its surface, and so a plurality of times of use seemed to be possible.

COMPARATIVE EXAMPLE 3

As with Comparative Example 1, twelve columnar rods of 800 mm in length and 30 mm ø in diameter were fabricated from high-purity isotropic high-density graphite (trade name ISO-630, available from Toyo Tanso Co., Ltd.). Two rods of them were joined in series by using the trapezoidal male screw threads and trapezoidal female screw threads to provide a high-purity isotropic high-density graphite mandrel of 1,550 mm in length and 30 mm ø in diameter. The high-purity isotropic high-density graphite used had a bulk density of 1.82 g/cm$^3$, a tensile strength of 53.9 MPa and an ash content of 10 ppm or less. The mandrel thus obtained was subjected to breaking weight measurement by static tensile weight as in the case of Example 1. As a result, the screw thread was broken at a breaking weight of 3,900 N. Furthermore, the remaining 10 rods were subjected to high purification treatment and then were joined at nine sites by means of the trapezoidal male screw threads and trapezoidal female screw threads to provide a high-purity isotropic high-density graphite mandrel J of 7,550 mm in length and 30 mm ø in diameter. As with Example 7, the aforementioned high-purity isotropic high-density graphite mandrel J was disposed in the center of the cylindrical carbon mold in FIG. 10 and then the mold was filled with a quartz powder. The overall carbon mold filled with this quartz powder was heated in a vacuum furnace under the conditions similar to Example 7 to produce a large quartz glass body of a hollow cylinder shape. The mandrel used was slightly distorted, and thus an error of size precision was observed on the inner peripheral side (hollow portion) of the quartz glass body.

COMPARATIVE EXAMPLE 4

As with Comparative Example 2, the aforementioned C/C composite mandrel F was disposed in the center of a cylindrical carbon mold and then the mold was filled with a quartz powder. The overall carbon mold filled with this quartz powder was heated in a vacuum furnace under the conditions similar to Example 7 to produce a large quartz glass body of a hollow cylinder shape. The rod-like element used was bent in the pin fixing portion, and thus it was difficult to withdraw the element from the quartz glass body. When it was forcibly withdrawn by means of heating and a weight load, the inner periphery of the quartz glass body was extensively distorted.

INDUSTRIAL APPLICABILITY

A mandrel for producing quartz glass of the present invention exhibits a good heat resistance, and an excellent load resistance and excellent process ability. For example, even when it is used for the production of a large synthetic quartz glass body exceeding 1 t, a large high-purity synthetic quartz glass body can be manufactured precisely and low-costly without damage and sliding on the joint during production.

The invention claimed is:

1. A mandrel used for producing a quartz glass body, comprising at least two columnar or cylindrical, carbon fiber reinforced carbon composite material made members joined in series by screw thread parts, wherein said mandrel is straight in a longitudinal direction.

2. A mandrel used for producing a quartz glass body, comprising at least two columnar or cylindrical, carbon fiber reinforced carbon composite material made members joined in series by screw thread parts, wherein threads on a first member and threads on a second member connect said first and said second members.

3. The mandrel according to claim 2 wherein said threads on said first member are in contact with said threads on said second member.

4. A mandrel used for producing a quartz glass body, comprising at least two columnar or cylindrical, carbon fiber reinforced carbon composite material made members joined in series by screw thread parts, wherein at least one of said screw thread parts comprises an inner periphery and an outer periphery, said at least one of said screw thread parts comprising threads on said inner periphery and a reinforcing member made of a carbon fiber reinforced carbon composite material on said outer periphery.

* * * * *